United States Patent
Hawthorn

(10) Patent No.: US 10,182,031 B2
(45) Date of Patent: *Jan. 15, 2019

(54) AUTOMATED MESSAGE SECURITY SCANNER DETECTION SYSTEM

(71) Applicant: Wombat Security Technologies, Inc., Pittsburgh, PA (US)

(72) Inventor: Trevor Tyler Hawthorn, Ashburn, VA (US)

(73) Assignee: WOMBAT SECURITY TECHNOLOGIES, INC., Pittsburgh, PA (US)

(*) Notice: Subject to any disclaimer, the term of this patent is extended or adjusted under 35 U.S.C. 154(b) by 140 days.

This patent is subject to a terminal disclaimer.

(21) Appl. No.: 15/390,070

(22) Filed: Dec. 23, 2016

(65) Prior Publication Data

US 2018/0183749 A1    Jun. 28, 2018

Related U.S. Application Data

(63) Continuation of application No. 15/388,961, filed on Dec. 22, 2016, now Pat. No. 9,876,753.

(51) Int. Cl.
*G06F 15/16* (2006.01)
*H04L 12/58* (2006.01)

(52) U.S. Cl.
CPC .............. *H04L 51/34* (2013.01); *H04L 51/12* (2013.01); *H04L 51/14* (2013.01); *H04L 51/18* (2013.01)

(58) Field of Classification Search
CPC ......... H04L 51/34; H04L 51/12; H04L 51/14; H04L 51/18

USPC ......................................................... 709/206
See application file for complete search history.

(56) References Cited

U.S. PATENT DOCUMENTS

| | | |
|---|---|---|
| 6,324,647 B1 | 11/2001 | Bowman-Amuah |
| 8,205,255 B2 | 6/2012 | Benea et al. |
| 8,468,244 B2 | 6/2013 | Redlich et al. |
| 9,143,529 B2 | 9/2015 | Qureshi et al. |
| 9,253,207 B2 | 2/2016 | Higbee et al. |
| 9,262,629 B2 | 2/2016 | Belani et al. |
| 9,280,911 B2 | 3/2016 | Sadeh-Koniecpol et al. |
| 9,306,887 B1 | 4/2016 | Brunetti et al. |
| 9,356,948 B2 | 5/2016 | Higbee et al. |
| 9,373,267 B2 | 6/2016 | Sadeh-Koniecpol et al. |
| 9,398,038 B2 | 7/2016 | Higbee et al. |
| 9,672,355 B2 | 6/2017 | Titonis et al. |
| 9,876,753 B1 * | 1/2018 | Hawthorn ............... H04L 51/34 |

(Continued)

OTHER PUBLICATIONS

Burri, N., Thesis: "Spamato, a Collaborative Spam Filter System" Swiss Federal Institute of Technology Zurich, Nov. 4, 2003.

(Continued)

*Primary Examiner* — Kristie D Shingles
(74) *Attorney, Agent, or Firm* — Fox Rothschild LLP

(57) ABSTRACT

An electronic messaging system includes a messaging server that identifies a recipient for an electronic message. The messaging system sends the recipient an electronic message that includes instrumented content. A web server monitors activity and determines whether interaction occurred with the instrumented content. The web server determines whether a sandbox intercepted the message based on whether interaction occurred, or did not occur, with the instrumented content within a threshold time period or with one or more activity characteristics.

22 Claims, 9 Drawing Sheets

(56) References Cited

U.S. PATENT DOCUMENTS

| | | |
|---|---|---|
| 2004/0107345 A1 | 6/2004 | Brandt et al. |
| 2005/0183143 A1 | 8/2005 | Anderholm et al. |
| 2006/0004896 A1 | 1/2006 | Nelson et al. |
| 2006/0053203 A1 | 3/2006 | Mijatovic |
| 2006/0168066 A1 | 7/2006 | Helsper et al. |
| 2007/0005702 A1 | 1/2007 | Tokuda et al. |
| 2007/0027992 A1 | 2/2007 | Judge et al. |
| 2007/0180525 A1 | 8/2007 | Bagnall |
| 2007/0226796 A1 | 9/2007 | Gilbert et al. |
| 2007/0271613 A1 | 11/2007 | Joyce |
| 2008/0244715 A1 | 10/2008 | Pedone |
| 2009/0089859 A1 | 4/2009 | Cook et al. |
| 2009/0241168 A1 | 9/2009 | Readshaw |
| 2010/0235918 A1 | 9/2010 | Mizrahi et al. |
| 2011/0167011 A1 | 7/2011 | Paltenghe et al. |
| 2012/0124671 A1 | 5/2012 | Fritzson et al. |
| 2013/0232576 A1 | 9/2013 | Kamikis et al. |
| 2014/0199664 A1 | 7/2014 | Sadeh-Koniecpol et al. |
| 2014/0201836 A1 | 7/2014 | Amsler |
| 2015/0237068 A1 | 8/2015 | Sandke et al. |
| 2015/0381653 A1 | 12/2015 | Starink et al. |
| 2016/0366541 A1 | 12/2016 | Jang et al. |
| 2017/0041338 A1 | 2/2017 | Martini et al. |

OTHER PUBLICATIONS

Schlachter, S., Thesis: "Spamato Reloaded, Trust, Authentication and More in a Collaborative Spam Filter System" Swiss Federal Institute of Technology Zurich, Feb. 18, 2004.

Wombat Security Technologies, Inc., "Case Study: Carnegie Mellon University—A Multi-Pronged Approach to Combat Phishing" dated Mar. 2011.

Wombat Security Technologies, Inc., "PhishGuru Phishing Attack Simulation Service" dated May 2012.

Wombat Security Technologies, Inc., "PhishGuru: Operations Manual" dated Aug. 30, 2010.

Wombat Security Technologies, Inc., "PhishPatrol—A Purpose-built Filter to Catch Those Crafty Spear Phishing Emails That Make It Past Other Email Security" dated Apr. 2012.

Wombat Security Technologies, Inc., "PhishPatrol™ SpamAssassin Plugin Operations Manual" dated May 1, 2011.

Wombat Security Technologies, Inc., "Anti-Phishing Phyllis Training Game, Teaches Employees How to Identify Traps in Emails" dated 2011.

Wombat Security Technologies, Inc., "Anti-Phishing Phyllis™ Instructions" dated 2010.

Albrecht, K., Dissertation: "Mastering Spam A Multifaceted Approach with the Spamato Spam Filter System" submitted to the Swiss Federal Institute of Technology Zurich, dated 2006.

Albrecht, K. et al., "Spamato—An Extendable Spam Filter System" CEAS 2005—Second Conference on Email and Anti-Spam, Jul. 21-22, 2005, Stanford University, California.

Wombat Security Technologies, Inc., "PhishGuru Best Practices" 2012.

NIST Special Publication 800-53, "Recommended Security Controls for Federal Information Systems and Organizations," pp. 1-40 (2009).

"Advanced Spam Filtering Options," Microsoft Exchange Online Help, posted at https://technet.microsoft.com (Jun. 26, 2015).

Fette, et al., "Learning to Detect Phishing Emails", World Wide Web Conference Committee, May 8-12, 2007, Banff, Alberta, Canada.

NIST, "Risk Management Framework (RMF) Overview," published Apr. 3, 2013.

\* cited by examiner

AUTOMATED MESSAGE SECURITY SCANNER DETECTION SYSTEM

RELATED APPLICATIONS AND CLAIM OF PRIORITY

This patent document is a continuation of, and claims priority to, U.S. patent application Ser. No. 15/388,961, filed Dec. 22, 2016, titled "Automated Message Security Scanner System." The disclosure of the priority application is fully incorporated into this document by reference.

BACKGROUND

This patent document describes methods to evade and avoid interference or false-positives when sending electronic messages with instrumented content to recipients within organizations that use automated messaging security technologies.

Electronic messages with instrumented content (which are sometimes referred to as instrumented messages) include content that enables the sender to passively or actively determine whether and when the specific intended recipient received the message. An instrumented message also may be able to determine what (if any) action the recipient of the message took, such as viewing the message, accessing a URL (Uniform Resource Locator) associated with the message, or opening a file attachment associated with the message. One-time use content may include a URL that includes a unique, complex, time-limited URL that is intended to be accessed by the recipient in order to gain access to a system, signal the sender that the intended recipient of the message took action on the message, or to set a new password within an application.

Legitimate organizations use instrumented messages to determine what happened to the message as it was transmitted and received by the recipient's network devices, servers, user computing devices, or human end user. Instrumented messages contain metadata or other content, which is optionally unique and/or recipient-attributable, that the sender can use to detect when a recipient interacts with the message. Examples of recipient interactions include processing the email by a network device of the recipient; reading the message in a messaging client; accessing the message's header, metadata, and/or body; accessing a link in the message; processing message content; or opening a file attachment associated with the message. When a recipient takes action on the instrumented content of an instrumented message, a notification is triggered by accessing the instrumented content in the message. The notification is received by a network server or other computing device associated with the sender. This notification allows the sender to determine the nature of the action taken that the recipient took on the instrumented message.

Cyber-attacks can occur when an individual or organization targets another individual or organization with malicious messages that are disguised as legitimate. These malicious messages may contain or be associated with malicious content, such as URL links to malicious web sites or malicious file attachments. When the victim user clicks on a malicious link contained within such a message, their web browser (or other associated software based on the nature of the embedded link) will connect to the malicious website that will cause the victim's computing device or connected computing devices to download and become infected with malicious software. If the attack uses a malicious attachment, if the victim opens the file attachment the attachment will cause the victim's computing device or other networked devices to become infected with malicious software. The malicious software can expose the victim and/or his/her organization to security risks by exposing, destroying or altering sensitive data that is stored on the network, or by causing the device or system to serve as a processor for remote activities associated with the cyber-attack.

Many organizations today utilize automated message security systems that inspect all incoming messages for signs of malicious content, links, or attachments. These systems are commonly called sandboxes. Sandboxes are virtual machines or actual computing devices that are programmed to mimic the activity of an intended recipient of a message, but do so in an environment that is separate from the recipient actual computing environment, such as an immutable virtualized desktop environment, to avoid harming the recipient's computer or network if the message is malicious. When a message is delivered to a sandbox, content such as URLs and file attachments are extracted from the message. This content is sent to a web browser or other application within the sandbox where it is accessed by the sandbox's browser or other application, just as if the sandbox was a real user. If the content causes the sandbox to become compromised or behave in a suspicious way, the security system detects this behavior and blocks the message from being delivered to the user's real environment. The sandbox is then terminated, and subsequent messages are processed in the same way. Given the security protections afforded by automated message security systems, the recipient organization cannot disable or make exceptions to this process for specific message senders. All messages must be processed to ensure that they are not malicious.

The challenge facing legitimate organizations that send legitimate instrumented messages is that sandboxes mimic user behavior by accessing the instruments within the message and causing it to appear as if a human end user accessed, viewed, or opened the message, URL, or file attachment. Current instrumented messages do not allow legitimate organizations to easily determine if the interaction was performed by an automated message security system or the intended recipient. Further, systems that may want to ensure the accuracy of data returned from instrumented messages may not be able to avoid interference by automated message security systems.

This document describes devices and methods that are intended to address at least some issues discussed above and/or other issues.

SUMMARY

In a first embodiment, an electronic messaging system determines whether an electronic message was delivered to an intended recipient or intercepted by a sandbox. A message generation server identifies a recipient for receiving a message. The message generation server selects a first identifier that may be actuated and a second identifier that may be actuated. The first identifier comprises a hyperlink that is associated with a web page at a web address. The message generation server generates an electronic message so that the message includes the hyperlink, and it transmits the electronic message to the recipient via a communication network for delivery to an address of the recipient. A web server hosts the web page so that the web page includes the second identifier in a format that is not visible to a human user of the web page. The system monitors whether interaction occurs with the second identifier, and it determines whether a sandbox may have intercepted the electronic message based on whether the system detects interaction with the second identifier.

Optionally, the system may determine that the sandbox intercepted the electronic message before delivery to the recipient if the web server detects interaction with the address of the second hyperlink within a threshold period of time. Otherwise, the system may determine that the electronic message has not been intercepted.

In a second embodiment, an electronic messaging system determines whether an electronic message was intercepted by a sandbox. A message generation server selects a first identifier that may be actuated and a second identifier that may be actuated, so that the first identifier and the second identifier share at least one common attribute, and so that the first identifier and the second identifier also include each at least one attribute that is not common. The message generation server generates a first electronic message so that the first electronic message includes the first and second identifiers, and it transmits the first electronic message for delivery to a first recipient address via a communication network. A web server detects interaction with the first identifier. The web server also monitors whether interaction occurs with the second identifier within a threshold period of time after detecting interaction with the first identifier. If interaction occurs with the second identifier within the threshold period of time, the system will determine that the first electronic message has been intercepted by a sandbox, otherwise the system will determine that the first electronic message has not been intercepted.

Optionally, the first identifier includes a hyperlink and the second identifier also includes a hyperlink. If so, then when monitoring whether interaction occurs with the first and second identifiers the system may, for each identifier, monitor an address associated with the identifier's hyperlink to determine whether a service request is received at the address. Optionally, the common attribute may include a domain.

Optionally, the first identifier may include a message attachment and the second identifier also may include a message attachment. If so, then when monitoring whether interaction occurs with the first and second identifiers the system may, for each identifier, determine whether an action that the identifier is configured to perform upon opening the message attachment has occurred. Optionally, the common attribute may include a file extension.

Optionally, the first identifier may include an address of a first image that is stored on an image server. The second identifier may include an address of a second image that is also stored on an image server. The common attribute may include an address of the image server. When monitoring whether interaction occurs with the first and second identifier the system may, for each identifier, determine whether the image server has received a request for the identifier's image.

In a third embodiment, a message generation server selects a first identifier that may be actuated, selects a second identifier associated with a recipient, and generates a group of electronic messages so that: (i) each electronic message embeds the first identifier using one of several candidate embedding methods; (ii) the electronic messages collectively use more than one of the embedding messages; and (iii) each electronic message embeds the second identifier in a way that the message generation server knows is likely to be accessed. The message generation server will generate a recipient address associated with a recipient that the message generation server knows is invalid or that the message generation server determines is likely to be invalid. The message generation server will transmit the electronic messages for delivery to the recipient address via a communication network. A web server will monitor whether one or more interactions occur with the first and second identifiers in the electronic messages within a threshold period of time. The web server will generate a cumulative fingerprint based on the one or more interactions with the first and second identifier in the electronic messages.

Optionally, the message generation server also may generate one or more additional electronic messages, wherein each of the additional electronic messages embeds the first and second identifiers based on the cumulative fingerprint. The message generation server also may generate another recipient address associated with a recipient that the message generation server knows is valid or that the message generation server determines is likely to be valid. The message generation server may transmit the one or more additional electronic messages for delivery to the other recipient address via a communication network. Optionally, the interactions with the first and second identifier may be indicative of one or more of the following characteristics: an IP address, an IP address range, a DNS name, a browser type, a browser version and a browser plugin.

DETAILED DESCRIPTION

Figure 1:
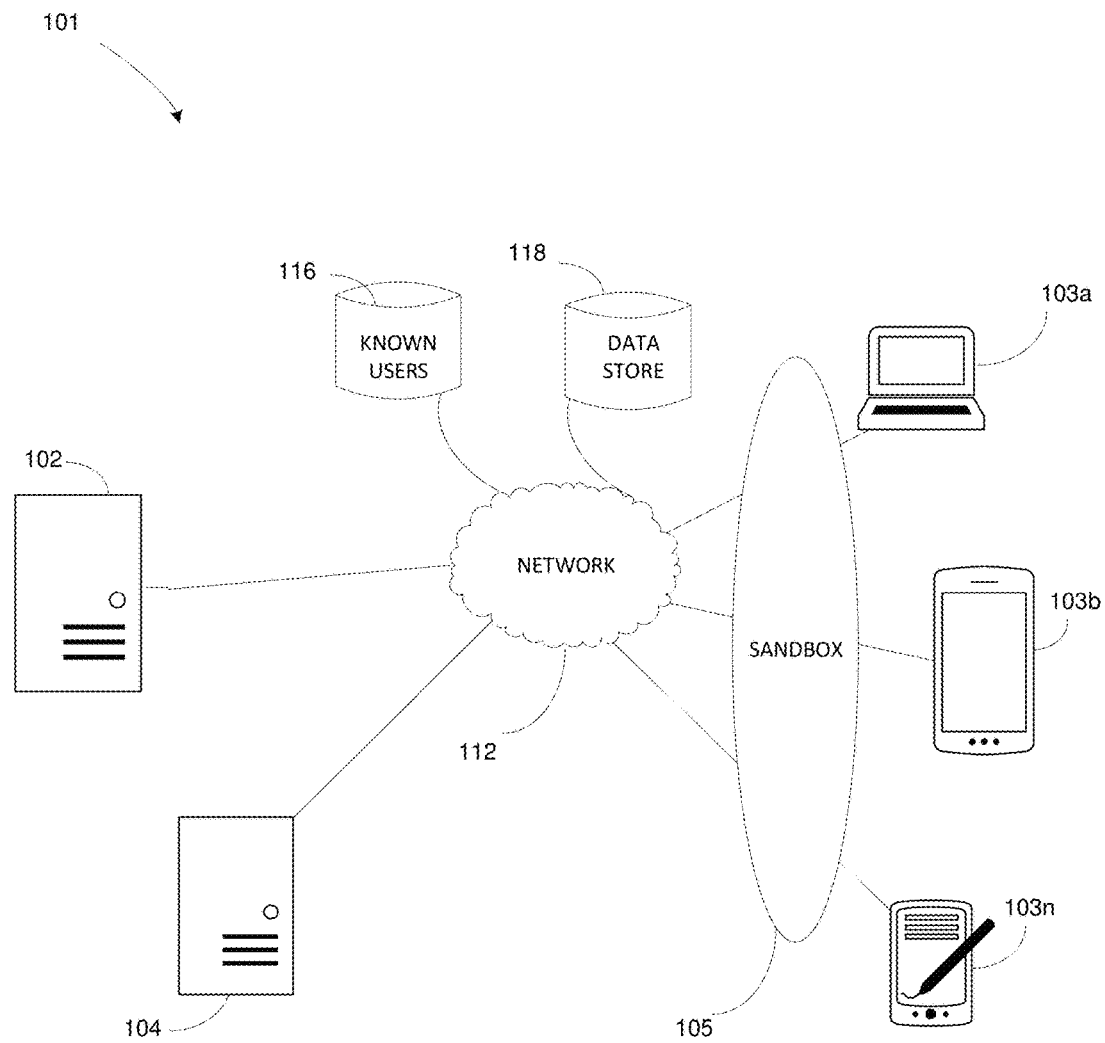
FIG. 1 depicts a communication network according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

For the purposes of this document, the terms "electronic device," "computing device" and "server" interchangeably refer to a device or system of one or more devices that includes at least one processor and non-transitory, computer-readable memory. Each device may have its own processor and memory, or the processor and/or memory may be shared with other devices as in a virtual machine or container arrangement. The memory will contain or receive programming instructions that, when executed by the processor, cause the device to perform one or more operations according to the programming instructions. Examples of computing devices include networked servers, personal computers, virtual machines, containers, gaming systems, televisions, wearable electronic devices (such as smart watches), implantable electronic devices, and portable electronic devices such as smartphones, personal digital assistants, cameras, tablet computers, laptop computers, media players and the like. Where appropriate for the context, the term "electronic device," "computing device" or "server" also may refer to a software application configured to operate on an electronic device, or firmware that is installed in an electronic device. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In some embodiments, specialized electronic devices other than general purpose computing devices may be used. Examples include a smartphone having a transceiver that may send and receive messages via wireless communications capability; a computing device having a wireless network transceiver that can connect to and exchange communications with other devices via a wireless network access device; a media player; and the like.

When used in this document, the term "processor" refers to logic circuitry that is configured to implement programming instructions that cause an electronic device to perform various functions. Unless specifically stated otherwise, the term "processor" can refer to a single processing device or to multiple processing devices that together implement various steps of a process.

Each of the terms "memory," "computer-readable medium" and "data store" refers to a non-transitory device on which computer-readable data, programming instructions or both are stored. Unless the context specifically states that a single device is required or that multiple devices are required, the terms "memory," "computer-readable medium" and "data store" include both single-device and multiple-device embodiments, as well as portions of such devices such as memory sectors.

In this document, the term "sandbox" refers to a secure computing environment for executing untested or untrusted programs or code, or for intercepting any suspicious or malicious electronic messages from a communication network and taking action on certain content in that message, possibly from unverified or untrusted sources. A sandbox may be implemented as a stand-alone computing device, or it may be a virtual machine that uses processing and/or memory resources of a computing device but in a computing environment that separate from the primary computing environment of the computing device (e.g., client device or server device) in which the device receives electronic messages from a communication network and presents the messages to a user of the device. The sandbox thus operates in a computing environment that is separate from the device's primary computing environment so that if executes a malicious file or downloads malicious content, the results will remain within the sandbox and will not pass to the primary computing devices. This helps to reduce the risks of harm to the computing devices.

The term "fingerprint" refers to characteristics or patterns associated with certain ways that one or more identifiers can be embedded into a message, or certain interaction behaviors associated with one or more such identifiers. For example, a fingerprint may be associated with one or more of the following characteristics: a browser version, a network domain, a color model of a distal display screen, a screen resolution value, an IP address, an attachment, an image, a session domain or some other characteristics that may be an attribute of an electronic message.

The term "instrumented content" means content that is embedded in an electronic message, attached to an electronic message as an attachment, or embedded in an electronic document such as a word processing file or web page, with a function that enables the sender to determine whether and when a recipient of the message interacted with the content. Examples of instrumented content include a hyperlink, an image with an embedded link to a remote server that the sender controls or monitors so that the remote server can determine when the link is selected, or an attachment that sends a message to or otherwise interacts with a remote server when opened. An "instrumented message" is an electronic message that includes embedded or attached instrumented content.

Very often, electronic messages on a communication network are automatically scanned or intercepted by a sandbox on the network before the messages reach the intended recipients. For example, a simulated phishing message that is generated by a network and delivered to an intended recipient for educational and training purposes may be intercepted by a virtual machine on the network before the message reaches the intended recipient. To avoid automated security scanning of messages by a sandbox or to reduce the interference of electronic messages on a network caused by a sandbox, a network device that is responsible for sending electronic messages may generate one or more identifiers and store them in a data store, embed one or more identifiers in the messages, and collect activity associated with the identifiers, and determine whether a message has been interacted with by an automated or non-automated system based on the interactions with the identifiers. In this document, the term "identifier" is intended to refer to an instrumented content element of an instrumented message, such as a URL or an executable file. An identifier also may be an instrumented content element of a website whose address is contained in the electronic message, such as a URL or executable file posted at that website. Various embodiments will be described in more detail below in this document.

With reference to FIG. 1, a communication system 101 may include a message generation server 102, one or more client computing devices 103a . . . 103n, and a web server 104. The system 101 may also include a sandbox 105 that scans and/or intercepts the messages between the network and client computing devices.

The sandbox 105 may be implemented in a communication server that distributes messages to the client communication devices, it may be implemented in any of the client devices, or it may be part of a separate device. The servers and client computing devices may be separate devices as shown, or any or all of them may be combined into one or more physical hardware components. The message generation server 102 is a computing device that executes programming instructions that are configured to cause it to generate one or more identifiers and embed the identifiers in one or more electronic messages, send the one or more electronic messages to one or more of the client devices via one or more wired or wireless networks 112. The electronic messages may be simulated phishing emails, and/or other electronic messages (such as emails, secure messaging service or SMS messages, MMS messages, instant messages, in-channel messages delivered by a service such as a social networking site, or messages delivered using some other messaging technology). The messages will contain a prompt intended to lure the user to take an action, such as to click a hyperlink in the message, to open an attachment contained in the message, to call a number, to visit a webpage and act on a hyperlink in the webpage, or disclose sensitive information. The web server 104 is a computing device with a processor and programming instructions that are configured to cause the server to receive and process interactions taken by a user in response to receiving any electronic messages generated by the message generation server 102, and determine whether an electronic message has been intercepted by a sandbox 105 or received by the intended recipient.

In various embodiments, the web server 104, the message generation server 102, or both may include or otherwise have access to a user database 116 containing identifying information about one or more users or recipients of the system who may receive messages. Information in the user database may include a message delivery address (e.g., email address), social media account information, mobile device phone number, or the like. Additionally, the web server 104, the message generation server 102, or both may include or otherwise have access to a data store 118 containing one or more unique identifiers that may or may not be associated with a user and that can be used to verify any actions a user might have taken in response to receiving an electronic message generated by the message generation server. For example, the identifier may be a hyperlink that can be embedded in an electronic message and that a recipient of the message may act upon. In another example, the identifier may be an Internet protocol (IP) address associated with the hyperlink. In another example, the identifier may be an IP address of an image on an image server, where a user may click a hyperlink to get access to the image by that IP address.

Each client computing device (e.g., 103a) has access to programming instructions that are configured to cause the device to receive electronic messages from the communication network, including but not limited to the electronic messages generated by the message generation server 102 or any electronic messages on the network, such as emails, text/voice/video messages, attachments, software applications, application plug-ins, digital presentations of a user interface to be displayed on a recipient's computing device, or cybersecurity messages originating from the message origination server 102. The client computing device can receive electronic messages via one or more messaging clients. Examples of messaging clients include e-mail clients, SMS messaging clients, social media messaging applications, or other client applications that receive and display messages for the device's user to review. The messaging clients may also allow a user to respond to a message, forward a message, interact with a message, or generate and send another electronic message to a server or another client computing device or one or more computing device associated with a recipient.

The web server 104 has access to programming instructions that can be configured to determine whether any electronic message generated by the message generation server 102 has been received by the intended recipient or has been intercepted by a virtual machine on the network. This determination may be based on monitoring and detecting any interaction associated with one or more identifiers in the electronic messages that are delivered to the network, and determining whether any interaction has been acted in an automated way or a non-automated way. Details of various embodiments will be further explained in this document below.

Although the embodiments above describe and show the web server and the message generation server as separate components, when those terms are used in this description and the claims the include both the separately illustrated embodiment of FIG. 1 as well as in embodiments where the functions of the web server and the message generation server are performed by a single device or a common group of devices. Thus, the two servers may be separate devices, or they may include differing sets of programming instruction being executed by one or more common devices.

Figure 2:
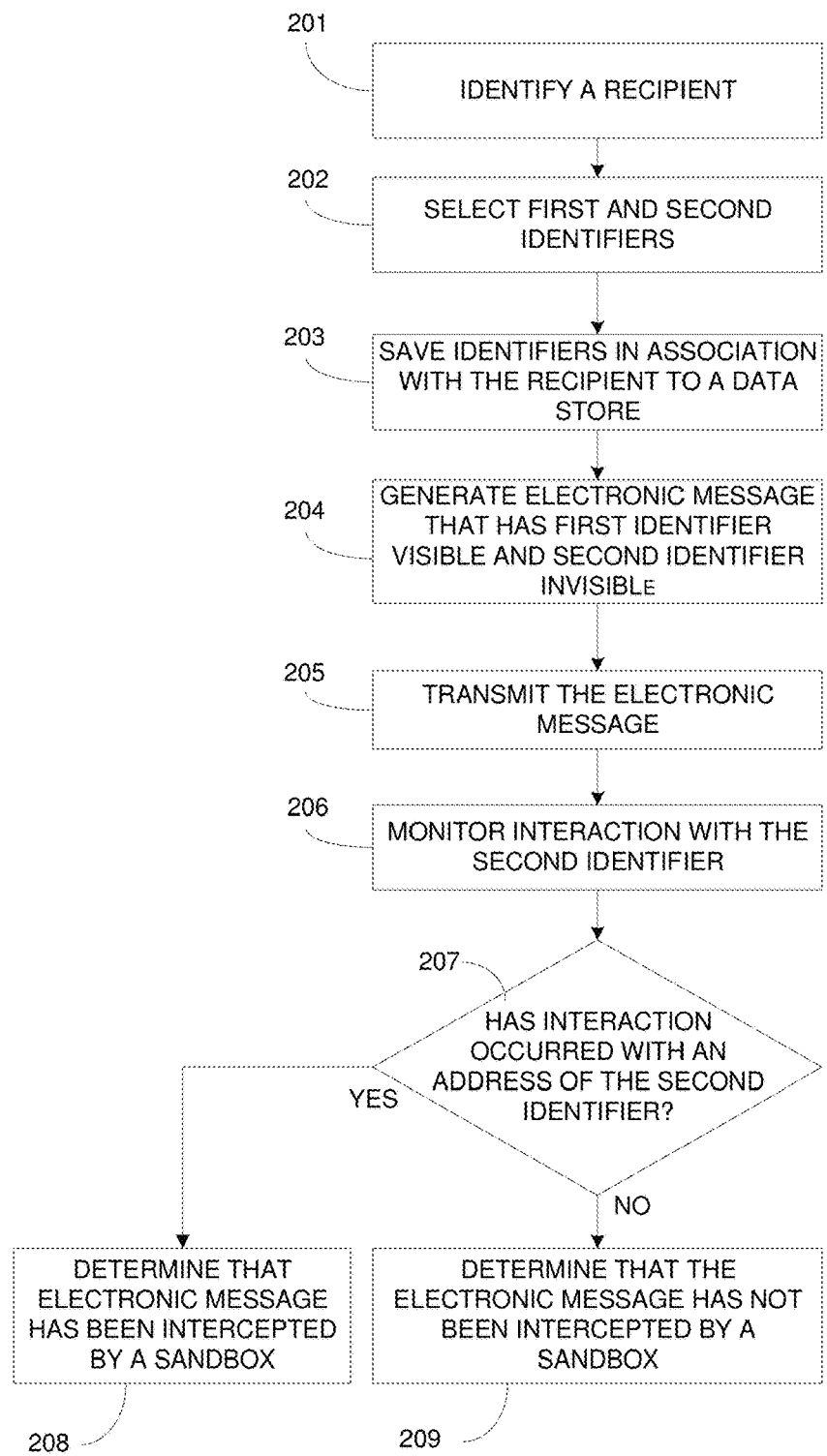
FIG. 2 is a flow diagram illustrating various actions that the system may take to determine if an electronic message has been intercepted by a sandbox according to an embodiment.

With reference to FIG. 2, in one embodiment, a message generation server may be configured to identify a recipient who is to receive a message 201. The server may do this by accessing a data set and retrieving identifying information for the recipient from the data set, by receiving the identifying information from an administrator, by extracting the identifying information from a message, or by some other method. The message generation server will select at least two identifiers 202. For clarity of discussion this document may refer to the identifiers as first and second identifiers, but this labeling is for reference only and does not mean that one must be created first or must appear first in the message. The system will save the first and second identifiers in association with the recipient to a data store 203, generate an electronic message that includes the first and second identifiers 204, and transmit the generated electronic message to the communication network 205 for delivery to the recipient. In an embodiment, the first and second identifiers can each be a hyperlink, and they may be embedded in the electronic message in a way such that the first identifier (hyperlink) appears in the message in a format that will be visible to the recipient after the recipient receives the message, and that the second identifier (hyperlink) appears in the message in a format that will not be visible to the human eye when the message is displayed but that can be detected by an automated system such as a sandbox.

For example, the first and second identifiers can be hyperlinks inside HTML codes, of which certain fields are going to be visible to the user and certain fields are not. The first identifier may be placed in a visible field. The second identifier may be placed in the message using codes or markup language that prevent the identifier from appearing in, being accessible, or being interacted with from within the message's visual components. For example, an identifier that is embedded in the "href" field of a hyperlink tag will be visible to the user as a clickable item, whereas an identifier that is embedded in the "style" field of the hyperlink tag will not be visible to the user. In this embodiment, a sandbox will interact with each identifier by automatically clicking on each hyperlink, both hidden and not, optionally without determining which identifiers are visible and which are not. The interaction with the identifiers by the scanning system may be collected by a web server to be described below. Other types of interactions that may be detected are discussed later in this document, and each type of interaction may be used in each described embodiment.

Alternatively and/or additionally, there can be various other ways that the identifier may be placed in an electronic message. For example, the first identifier and/or the second identifier can be placed in the message header, the metadata, the body, or in an attachment of the electronic message. Either identifier can be in various forms such as a URL, a remote image, or a file attachment attribute.

Returning to FIG. 2, in one embodiment, a web server may be configured to monitor interaction with the second identifier to determine whether the sandbox interacts with the second identifier within a threshold time period 206. This period may be set to a time interval, within which a scanning system may likely have already acted on the identifier yet a human user may not. For example, the period may be between one and five seconds, or the period may be less than one minute. To monitor this interaction with the second identifier, the web server may detect whether an interaction has occurred with an address of the second identifier 207. The web server may do this by, for example, hosting a page associated with the second identifier and determining that a service request has been received for that web page. If the web server detects that an interaction has occurred with the address of the second identifier within the threshold time period, the web server may determine that the electronic message has been intercepted by a sandbox 208. If the web server detects interaction with an address of the first hyperlink but does not detect interaction with the second hyperlink within the threshold time period, the web server may determine (by inference) that the electronic message has not been intercepted by a sandbox 209 and/or that the message reached the recipient.

Figure 3A:
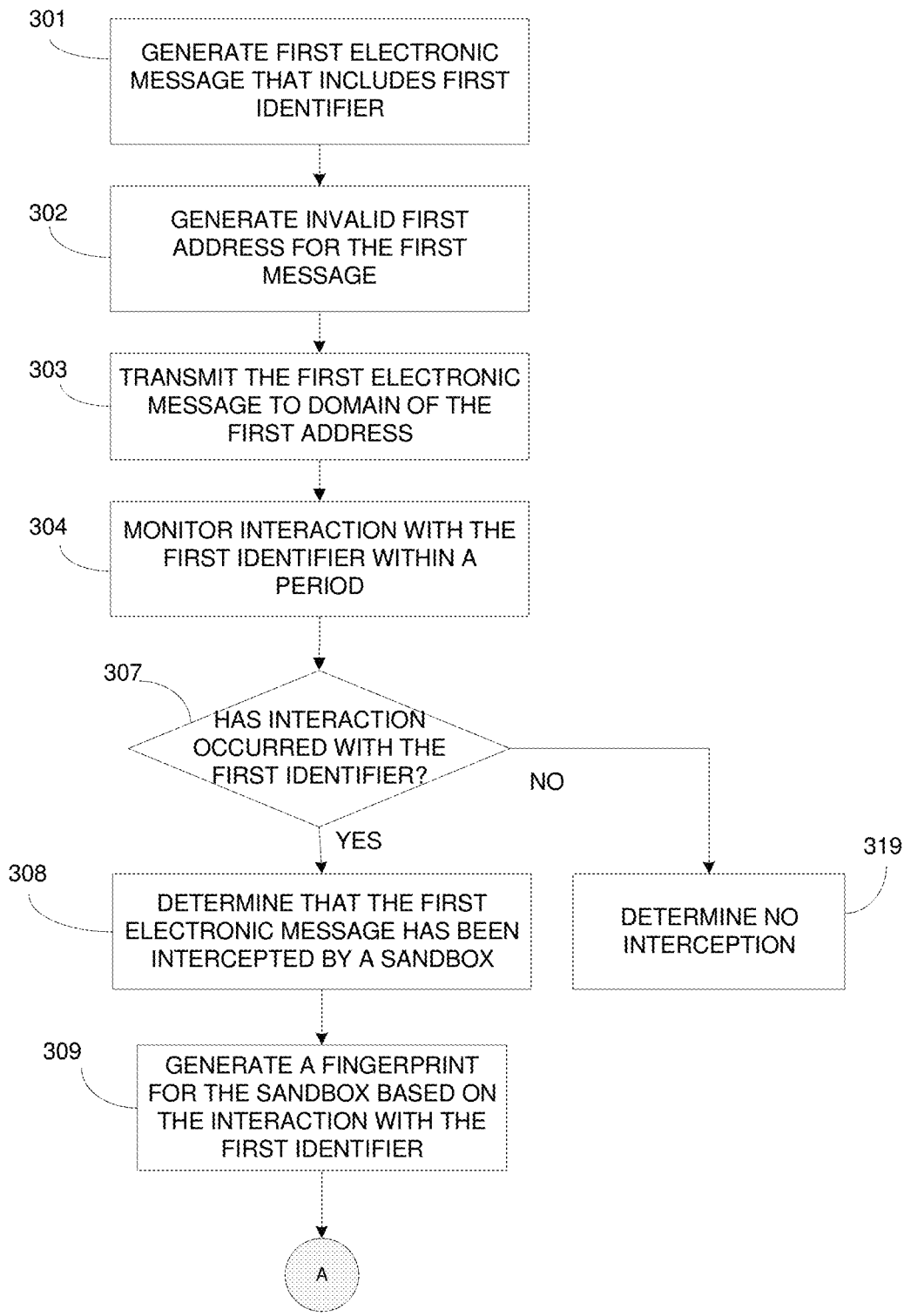
FIG. 3A illustrates various actions that the system may take to generate a fingerprint for the virtual machine according to an embodiment.

With reference to FIG. 3A, in an embodiment, the message generation server may be configured to select a first identifier that may or may not be associated with the recipient that is stored in a user database, and generate a first electronic message that includes the first identifier 301. This first identifier can be placed a header, metadata, body, or attachment of the message in various forms such as a URL, a remote image, or a file attachment attribute. The message generation server may also generate a first address (such as an email address, or another messaging system address or recipient identifier) that the message generation server knows is invalid or that the message generation server determines is likely to be invalid 302 but which will be received by a known recipient's system. For example, the invalid address may be an email address with a valid domain but invalid username (such as an email address of the following format: invalidexample@validexample.com), then the server may transmit the first electronic message to a network server of the valid domain so that, if the first address were valid, it would be delivered a first recipient 303 at that domain.

With further reference to FIG. 3A, if the organization receiving the message is using a sandbox, the sandbox may interact with the message even though the username is invalid. Since the recipient address was known to be invalid, the system can assume that any interaction detected as a result of the first message is attributable to a sandbox. In one embodiment, the web server may be configured to monitor the interaction with the first identifier within a threshold time period 304. The threshold time period can be set in a similar fashion as embodiments described with respect to FIG. 2. The interaction with the first identifier that occurs within the threshold time period may form a fingerprint that is attributable to the sandbox, and the fingerprint can then be used later to detect interceptions of future messages by the same sandbox (or by other sandboxes at the same domain).

In one embodiment, the web server may be configured to detect whether an interaction has occurred with the first identifier within the threshold period 307. In one embodiment, the first identifier may include a hyperlink to a service request, and the web server may monitor interaction with the first identifier by detecting whether a service request is received at the address associated with the first identifier within the threshold period. In another embodiment, the first identifier may include a message attachment, and the web server may monitor interaction with the first identifier by detecting whether an action that the message attachment is configured to perform upon opening the message attachment has occurred. In another embodiment, the first identifier may include an address of an image that is stored on an image server, and the web server may monitor interaction with the first identifier by detecting whether the image server has received a request for the image.

With further reference to FIG. 3A, if the web server detects that an interaction has occurred with the first identifier within the predetermined time period, the web server may determine that the first electronic message has been intercepted by a sandbox 308 and generate a fingerprint associated with the sandbox 309. In an embodiment, the fingerprint may be based on one or more of the following characteristics of the sandbox: an IP address, an IP address range, DNS names, a browser type, a browser version, a browser plug-in type, other browser characteristics, or any combination of these characteristics. The system may use the generated fingerprint to detect inceptions of future messages on the network, which will be more fully described below with reference to FIG. 3B. If no interaction has occurred with the first identifier occurred within the predetermined time period, the web server may determine that the first electronic message was not intercepted by a sandbox 319.

An example process of developing a fingerprint is a process that monitors activity associating with sent and/or received messages and generates a signature based on certain characteristics of that activity. For example, consider the following process:

(1) An organization uses the domain name company.com. Knowing that the email address test@company.com is not monitored by a human, the sending organization (avoidance.com) sends an email to this address.

(2) The email sent to test@company.com contains a unique clickable link (e.g. www.avoidance.com/abc123).

(3) The sending organization having control over the server at www.avoidance.com is able to monitor all activity with this server. For example, if someone access a page(s) on this server, the sending organization will be able to see it.

(4) After a period of time (e.g., around 60 seconds of sending the email with the /abc123 link), the sending organization sees the following first web server access log entry: 54.239.25.200 - - [29/Oct/2015:17:05:25 +0000] "GET /abc123 HTTP/1.1" 200 1204 - "SecurityScanPro 1.0 (Mozilla; Trident/7.0; rv:11.0) like Gecko".

(5) This system can use single log to identify information such as (a) that the IP address (54.239.25.200) known to be associated with a cloud provider, and (b) the User-Agent is a product web browser named "SecurityScanPro."

(6) Other content located on the /abc123 page may pull additional information from the web browser such as: (a) versions of plugins in use (e.g. Java v6.0, Flash v3.0, etc.); (b) web fonts installed; (c) keyboard language settings; (d) screen resolution and color depth; (e) browser window size; and (f) whether the user's mouse moves, and whether the movements are human-like (i.e., consistent with a pattern known to be associated with a user).

(7) The data from (5) and (6) above can be compiled into a signature. Then, when the characteristics above are accessed for visitors above to generate a new fingerprint, the system will determine whether the new fingerprint matches a previous fingerprint. The system can use this information to ensure that future clicks from "SecurityScanPro" are ignored and/or discarded.

The system may then determine whether the data above indicates that the activity is attributable to a human user, or to an automated security scanning system. The system may extract any number of facts from the log entry and data collected, and the system may determine a score using any suitable algorithm, such as a score value that is equal to the number of facts that suggest activity by an automated security scanning system. In this example, the facts that suggest activity by an automated security scanning system may include: (a) the IP address (54.239.25.200) is located within a cloud provider and thus likely not from a user within company.com's corporate network; (b) the User-Agent is "SecurityScanPro" rather than a known browser or security scanning product; (c) the versions of Java, Flash, Acrobat, or other plug-ins, are several versions out of date; (d) the browser version is very old (i.e., more than a threshold number of years or versions ago); (e) the User-Agent is abnormal (SecurityScanPro); the screen resolution is less than an expected threshold amount and thus not likely a modern device; (f) the color depth used is less than an expected threshold amount and thus very small compared to most modern devices; (g) the user's mouse never moved during their time on the site; and (h) the time between when the email was sent and the link clicked was less than a threshold time (e.g., 10 seconds). It is for these reasons that the system may determine that the click to /abc123 came from a security scanning device. As such, the "signature" for this visitor will be saved as being a security scanning device.

Figure 3B:
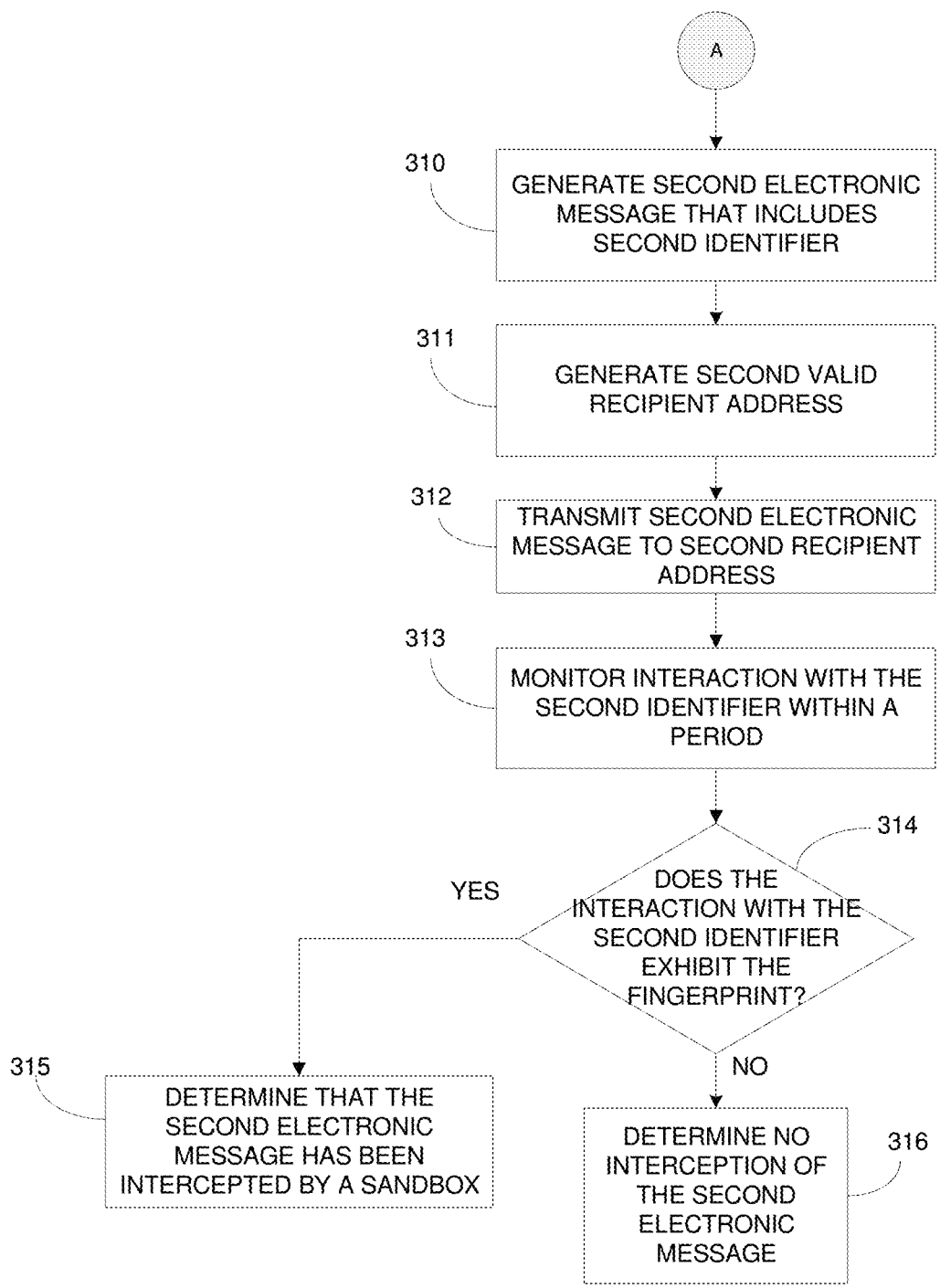
FIG. 3B illustrates various actions that the system may use the fingerprint of a sandbox to determine whether an electronic message has been intercepted by the sandbox according to an embodiment.

Referring to FIG. 3B, in an embodiment, the message generation server may be configured to generate an additional electronic message that includes a second identifier that can be interacted upon as instrumented content 310, generate a second recipient address that the message generation server knows is valid 311, and transmit the second electronic message via the communication network for delivery to the second recipient address 312. The second identifier can be placed in the second message in various ways, such as in the message header, the metadata, the body, or an attachment of the second message. The second identifier can be in various forms such as a URL, a remote image, or a file attachment attribute. The web server may be configured to monitor interaction with the second identifier within a threshold period of time 313 and determine whether the interaction with the second identifier exhibits or resembles the fingerprint generated from the first message based on the interaction with the first identifier (309 in FIG. 3A). If the web server determines that the interaction with the second identifier exhibits or resembles the fingerprint generated from the first message, it may determine that the second message has been intercepted by the sandbox on the network 315. If the web server does not detect any interaction with the second identifier with the predetermined period of time, or the interaction with the second identifier does not exhibit or resemble the fingerprint generated from the first message, then the web server may determine that the second message has not been intercepted by a sandbox on the network or that the second recipient has received the second message 316.

For example, the system may generate a fingerprint for a new message, generate a hash of the fingerprint, and compare it to hashes of known fingerprints. Two hashes may be considered similar if they are at least a threshold percentage similar (e.g., 90% similar). To calculate similarity, the system may use any known hash comparison tool such as ssdeep, a known hashing tool that will take the sum of various characteristics used in each fingerprint and perform a "fuzzy hash" comparison to measure a percentage of similarity.

Alternatively and/or additionally, the message generation server and/or the web server may be configured to send customized messages that include customized identifiers, with which the interactions may form a fingerprint that can be applied globally to multiple sandboxes. For example, if the system knows that an organization uses a known domain name (e.g., company.com) and it knows that a particular email address at that domain (e.g., test@company.com) is not monitored by a human, the sending organization (avoidance.com) may send an email to this address. The email sent to test@company.com may contain a unique human-clickable link (e.g., www.avoidance.com/abc123). The email sent to test@company.com also may contain a non-human-clickable link (e.g., www.avoidance.com/abc123-canary). The sending organization having control over the server at www.avoidance.com can monitor all activity with this server. For example, if someone accesses a page(s) on this server, the sending organization will be able to see it. After a threshold period of time (e.g., around 60 seconds after sending the email with the /abc123 link), the sending organization may see a first web server access log entry such as the following: 54.239.25.200 - - [29/Oct/2015:17:05:25 +0000] "GET /abc123-canary HTTP/1.1" 200 1204 - "SecurityScanPro 1.0 (Mozilla; Trident/7.0; rv:11.0) like Gecko". Given that the sending organization knows that the /abc123-canary URL is not clickable by a human, the sending organization can confidently conclude that the "fingerprint" determined during this interaction is attributable to an automated security scanner. Subsequent activity that exhibits than a threshold level of similarity (for example 90% similar) to this activity can also be attributed to an automated security scanner.

In another embodiment, the system can be configured to generate a fingerprint that can be used in the context of a single message or multiple messages sent as part of a coordinated message campaign. For example, the system may apply methods such as those described above (sending an email into an organization's 'test' email address and extracting "facts" based on the subsequent interactions that it sees), but do so while sending multiple emails to the test@company.com email address and record the subsequent interactions. Each message may use a different technique (or combination of techniques) to determine the organization's (company.com's) automated message security system's fingerprint. Example techniques that may be attempted include: (1) send an email with links "hidden" using HTML technique 1 to www.avoidance.com/abc_method 1; (2) send an email with links "hidden" using a CSS technique to www.avoidance.com/abc_method 2; (3) send an email with links "hidden" using both HTML and CSS techniques to www.avoidance.com/abc_method 3; and (4) send an email with links "hidden" using HTML technique 2 to www.avoidance.com/abc_method 4. The table below shows the messages sent and resulting facts gathered:

| # | IP Address | Date/Time Message Sent | Date/Time Message Clicked | Delta | Browser + Ver | Java | Flash | Screen Res. | Hash |
|---|---|---|---|---|---|---|---|---|---|
| 1 | 54.239.25.200 | Nov. 1, 2016 12:00:00 | Nov. 1, 2016 12:00:10 | +10 | IE 8 | 5 | 4 | 1024 × 768 | 0 × 33BEEFH |
| 2 | | | | | | | | | |
| 3 | 54.239.25.200 | Nov. 1, 2016 12:00:00 | Nov. 1, 2016 12:00:10 | +10 | IE 8 | 5 | 4 | 1024 × 768 | 0 × 33BEEFH |
| 4 | 54.239.25.200 | Nov. 1, 2016 12:00:00 | Nov. 1, 2016 12:00:10 | +10 | IE 8 | 5 | 4 | 1024 × 768 | 0 × 33BEEFH |

In the example above, methods 1, 3 and 4 were successful in attracting and recording certain facts about company-.com's automated security scanning system. Given the fluid nature of security attacks and ever-changing defenses, the sending organization may benefit from sending multiple messages to the test email address to determine the proper automated security system fingerprint.

Figure 4:
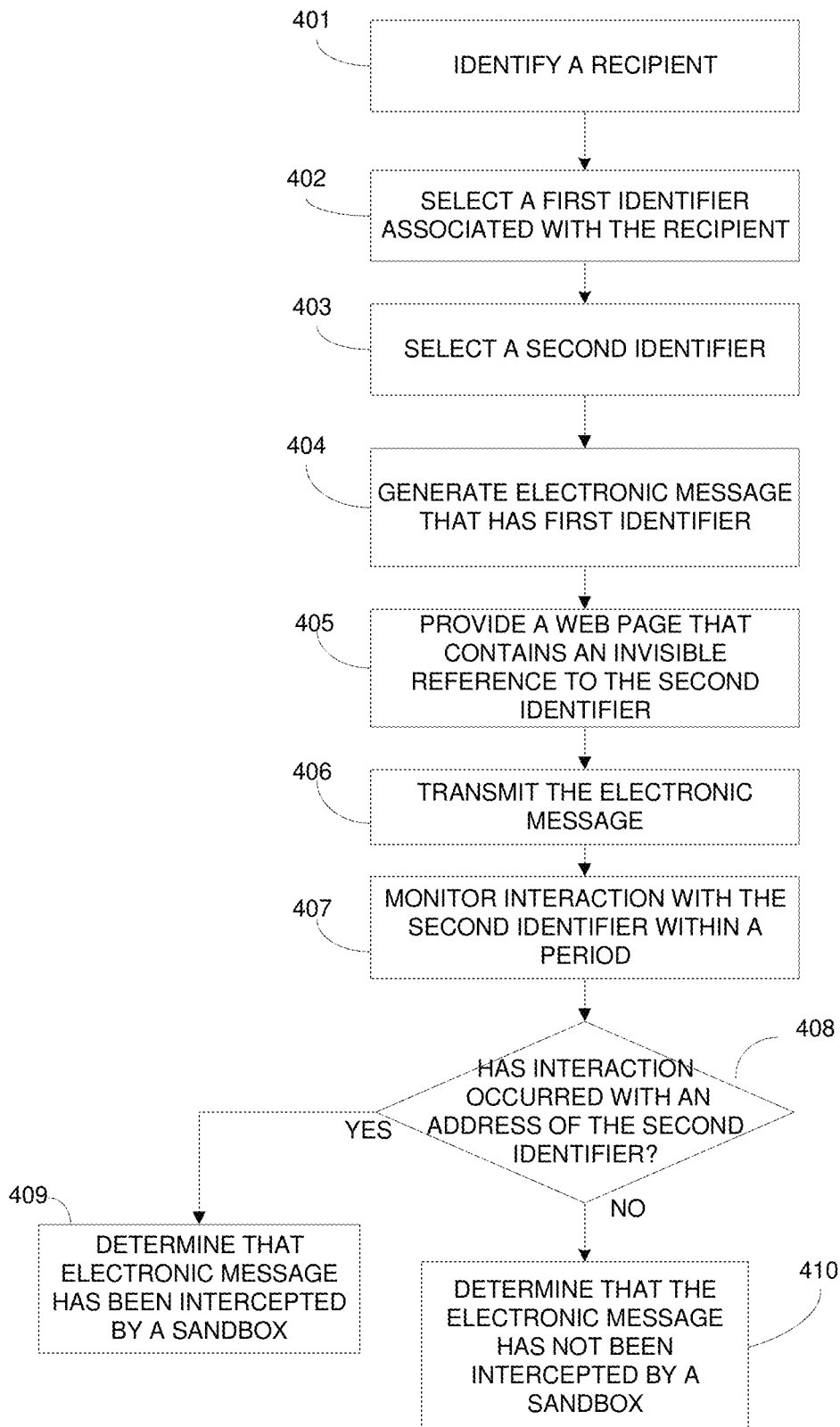
FIG. 4 is a flow diagram illustrating various actions that the system may take to determine if an electronic message has been intercepted by a sandbox according to an embodiment.

With reference to FIG. 4, in an embodiment, the message generation server may be configured to identify a recipient who is to receive a message 401. The server may do this by accessing a data set and retrieving identifying information for the recipient from the data set, by receiving the identifying information from an administrator, by extracting the identifying information from a message, or by some other method. The system may then select or generate a first identifier 402 a second identifier 403, such as hyperlinks corresponding to those described in the previous embodiments. The system may generate an electronic message that includes the first identifier 404, either in a form that is visible to a human user or in a form that is only detectible by automated scanning systems such as sandboxes. The system may generate a web page 405 that embeds the second identifier in manner that is not typically visible to a human reader of the page but that would be detected by a sandbox or other automated scanner that accesses the page obvious to a user or non-automated systems, and it may cause the page to be hosted at an address associated with the first identifier. The first identifier can be placed in various parts in the electronic message, such as the message header, the metadata, the body, or an attachment of the electronic message. The second identifier may be placed in the web page using codes or markup language that prevent the identifier from appearing in, being accessible, or being interacted with by a user or a non-automated system, or using a format in which the color of the text matches the color of the page's background on which the text is displayed. In this embodiment, the sandbox may interact with each identifier, both hidden and not, without necessarily determining which identifiers are visible and which are not.

With further reference to FIG. 4, the system may transmit the message 406 to a destination, and the web server can be configured to monitor the interactions made by a sandbox on the network. For example, the web server may be configured to monitor interaction with the second identifier within a threshold time period 407, and detect whether an interaction with an address of the second identifier has occurred 408 within that time period. If an interaction with the address of the second identifier has occurred, the web server may determine that the electronic message has been intercepted by a sandbox 409; otherwise, the web server may determine that the electronic message has not been intercepted 410. Variations of the embodiments described in FIG. 4 may also be possible without departing from the gist of the embodiments. For example, in another embodiment, instead of the message generation server performing the act, the web server may also be configured to select the second identifier from the data store and provide the web page that includes the second identifier.

Figure 5:
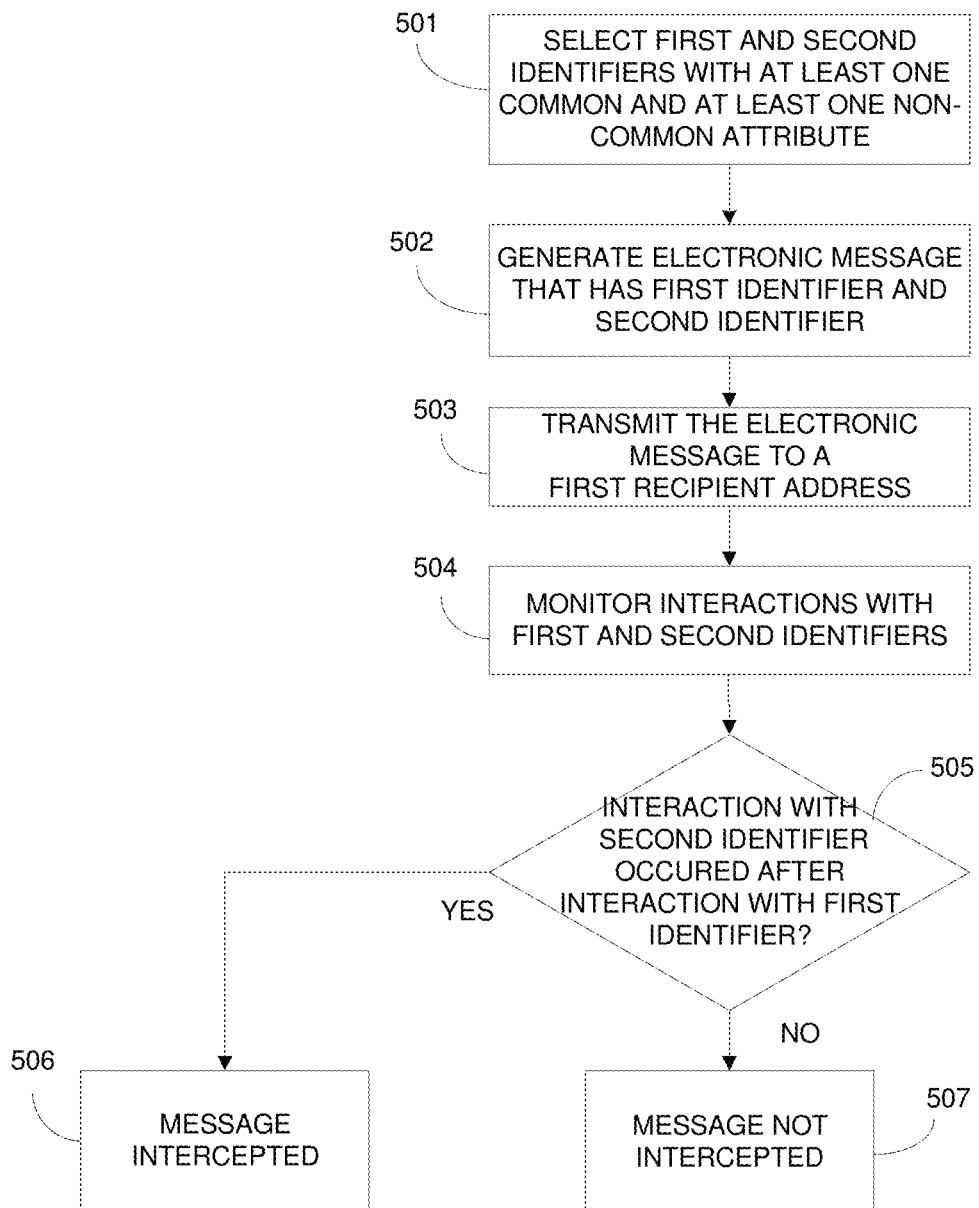
FIG. 5 illustrates various actions that the system may take to generate an electronic message that may avoid interference by a sandbox on a communication network according to an embodiment.

With reference to FIG. 5, in an embodiment, a message generation server may be configured to select a first identifier and a second identifier 501, where the first and second identifiers share at least one common attribute, and they each also include at least one attribute that is not common. For example, the first and second identifiers may have similar attributes that bear similar characteristics, such as URLs that share a common top-level domain, or URLs that contain similar but not-exactly-equal spellings. This first and second identifiers can be placed in various parts of the message, such as the message header, the metadata, the body, or the attachment of the message. The attachment can be in various forms such as an image file, or a file attachment attribute. In this embodiment, each identifier is typically visible to a human user. The message generation server may further be configured to generate an electronic message that has the first and second identifiers 502, and it may transmit the electronic message to a first recipient address 503. If a sandbox receives the message, it may act on only the first identifier found in a message. If the sandbox identifies the first URL and determines it to be non-malicious, subsequent message content may not be scanned or interacted upon. The messages that are generated as described in FIG. 5 will thus eliminate any interference by a sandbox and thus can be used to confirm that a sandbox has intercepted the message.

Thus, a web server may be configured to monitor interactions with both the first and second identifiers 504. In one embodiment, the web server may monitor for interaction with the second identifier within a threshold time period after detecting an interaction with the first identifier 505. If the system detects an interaction with the second identifier with the time period, the system may determine that the message was intercepted by a sandbox on the network 506; otherwise, the system may determine that the message has not been intercepted by a sandbox on the network and was instead delivered to the recipient 507.

Variations of the embodiments described with respect to FIG. 5 may also be possible as viewed by a person with ordinary skill in the art without departing from the gist of the embodiments. For example, the first identifier and the second identifier may each include a hyperlink to a service request, and the web server may monitor whether a service request is received at an address associated with the hyperlink of each of the identifiers. In another example, the common attribute between the first and second identifiers (or hyperlinks) may include a domain name. In another example, the first and second identifiers may each include a message attachment that is configured to cause a computing device to perform an action upon opening the message attachment, and the web server may monitor whether an action that the identifier is configured to perform has occurred. In another example, the common attribute between the first and second identifiers may include a file extension. In another example, the first and second identifiers may each include an address of an image that is stored on an image server, the common attribute between the first and second identifiers may include an address of the image server, and the web server may monitor whether the image server has received a request for the image associated with each of the identifiers.

Figure 6:
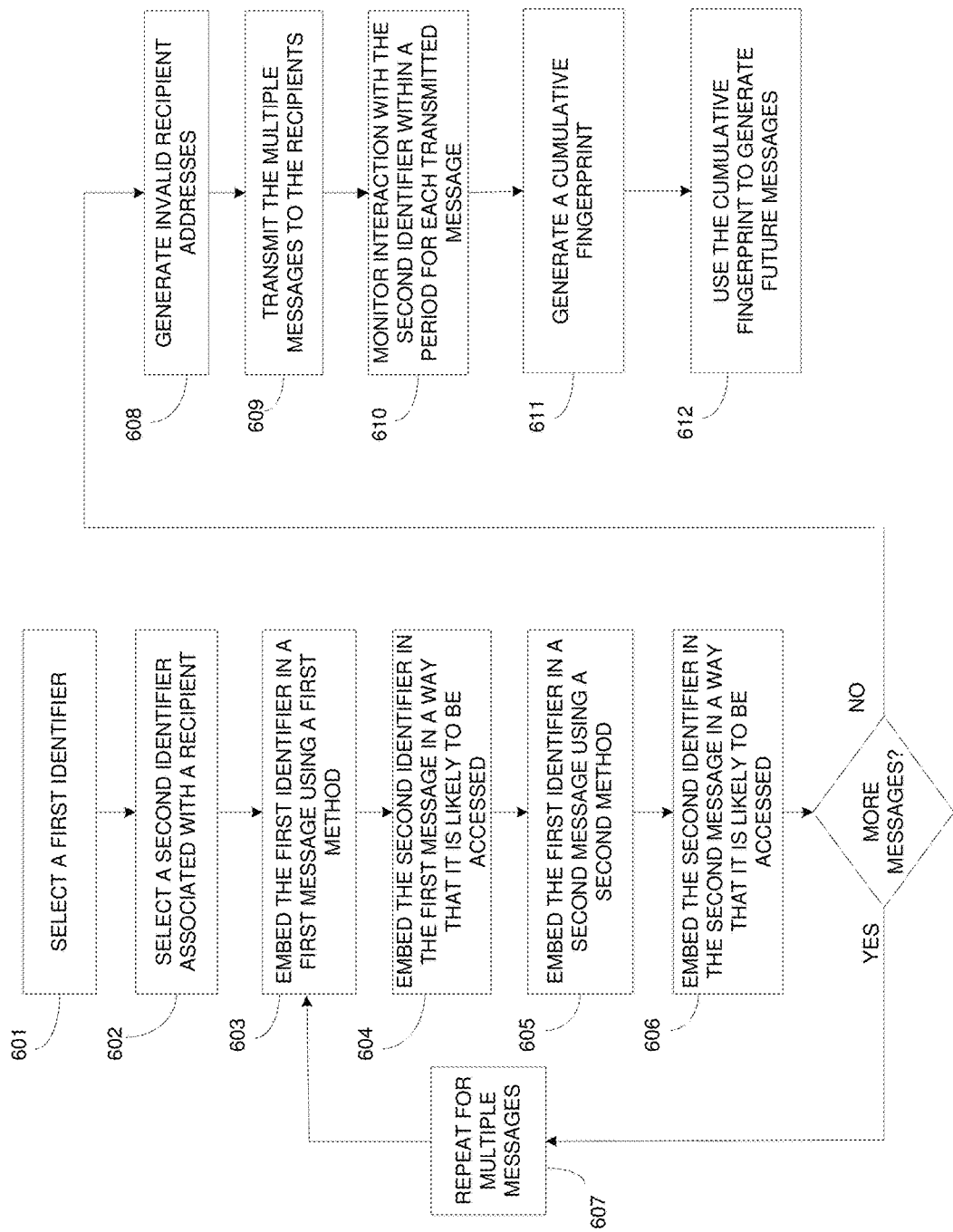
FIG. 6 illustrates various actions that the system may take to generate future messages that may avoid interference by a sandbox on a communication network according to an embodiment.

With reference to FIG. 6, in an embodiment, a message generation server may be configured to select a first identifier 601 (the first identifier may or may not be associated with a recipient), and select a second identifier that is associated with a recipient in a user database 602. (The association may be done before or after the selection). The server will embed the first identifier in a first electronic message using a first embedding method 603, embed the second identifier in the first message in a way that it is likely to be accessed, opened, or clicked on by both automated and non-automated recipients 604. The message generation server may be configured to generate a second, third, or more electronic messages, each embedding the first identifier in a similar method as the first embedding method 605, and each embedding the second identifier in a way that it is likely to be accessed, opened, or clicked on by both automated and non-automated recipients 606.

The first and second identifiers may be placed in the message in various ways, such as in the message header, the metadata, the body, or the attachment of the message. The identifier may be of various forms, such as a URL to a website, a hyperlink link to remote image, or a file attachment attribute. When embedding the first identifier in each of the multiple messages, the system may slightly alter the first identifier in each message. For example, the first identifier in a first message might be a URL that uses the same DNS domain name or fully qualified domain name as the second unique identifier. Subsequent messages might contain a URL with a reference to the first identifier that uses the same DNS sub-domain name as the second unique identifier. The message generation server may further repeat this process to generate multiple messages 607.

Figure 7:
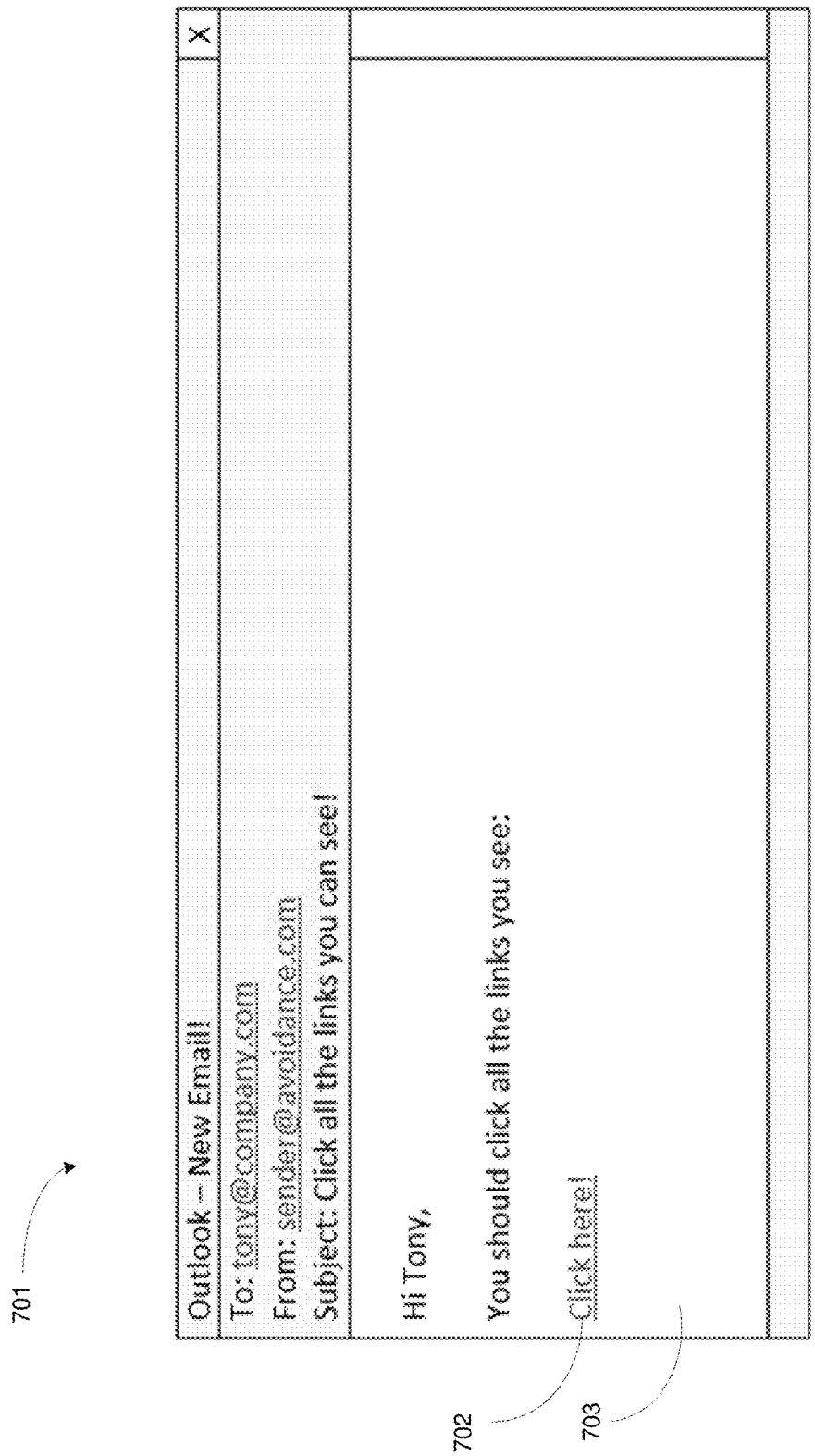
FIG. 7 illustrates an example of a message with embedded identifiers.

Identifiers may be embedded in user-visible or non-user-visible (user-invisible) formats. For example, the system may send a target user a message such as that shown in FIG. 7. The HTML code that may be used to embed a visible link such as the "Click here!" link 702 in the message 701 may look like this:

<a href=http://fresh.host.goggl.cc/alert_eb87b2_human_detected>Click here!</a>

This is a very basic HTML link that may be visible in many or all email programs. The value "eb87bc" is associated with the recipient (Tony) for this email. Below the visible link, the system may embed a second bit of HTML code that includes a link but uses a font that is not visible to the user, such as:

<a href="http://fresh.host.goggl.cc/alert_eb87b2_sandbox" style="text-decoration:none !important; text-decoration:none;">&nbsp;</a>

The style and text decoration applied to the link, and other HTML code, cause the link "fresh.host.goggl.cc/alert_eb87b2_sandbox" to be invisible to the human eye when displayed on a display screen. However, an automated message security system will detect this link and access it.

By way of example, the device may create a sequence of messages that each include two identifiers, one of which may be considered to be a "control" identifier that is in every message, and the other of which may be considered to be a "variable" identifier, such as the following:

Message #1:
www.host.com/msg1-var
www.host.com/msg1-control
Message #2:
www1.host.com/msg2-var
www.host.com/msg2-control
Message #3:
host.com/msg3-var
www.host.com/msg3-control In the example above, each message includes the control identifier www.host.com/msg?-control in which "?" is a wildcard.

With further reference to FIG. 6, the message generation server may generate one or more recipient addresses that are known to be invalid or one or more recipient addresses that are likely invalid 608. The network device then transmits the multiple messages to the network for delivering to the servers that would be associated with the recipient addresses 609 (such as messaging servers on the domains of the recipient addresses), in which each message contains the first and second identifiers. If an organization receiving the messages is using sandbox, the sandbox will interact with the first and second identifiers. During the interactions with multiple messages, the recipient's sandbox will interact with the network device and generate indicators that can be collected by the system.

Referring to the example above, when the system sends a sequence of messages that includes messages such as the three messages, it may monitor a network device associated with the control identifier (www.host.com) to determine for which messages the control identifier does not receive interaction. In this embodiment, when one or more of the messages are delivered to the recipient addresses and the system detects that the second identifier is not acted on, the system may determine that the specific embedding method and associated attributes used to embed the first and second identifiers can be used for future message transmissions to avoid interference by automated scanning systems.

In FIG. 6, in an embodiment, a web server or a message generation server may be configured to monitor interaction with the second identifier within a predetermined time period for each transmitted message 610 and generate a cumulative fingerprint 611, and the message generation server is further configured to use the cumulative fingerprint to generate future messages 612. In one embodiment, the system may generate the cumulative fingerprint based on interactions with the first and second identifiers for multiple electronic messages transmitted to the network. The interactions with the first and second identifier may be indicative of one or more characteristics such as IP addresses, IP address ranges, DNS names, browser vendors, browser versions, browser plugins, and other browser characteristics. The system may combine these indications to create a fingerprint that is attributable to an automated security scanner which can be stored in a data store on the network. Example methods of fingerprint generation are described above.

Alternatively and/or additionally, the system can be configured to generate a cumulative fingerprint that can be applied globally to multiple automated scanning solutions or can be used in the context of a single message or multiple messages sent as part of a coordinated message campaign. Examples are described above.

The steps and features of any or all of the examples shown in in FIGS. 2 through 7 may be combined with each other, or added together, to provide additional embodiments.

Figure 8:
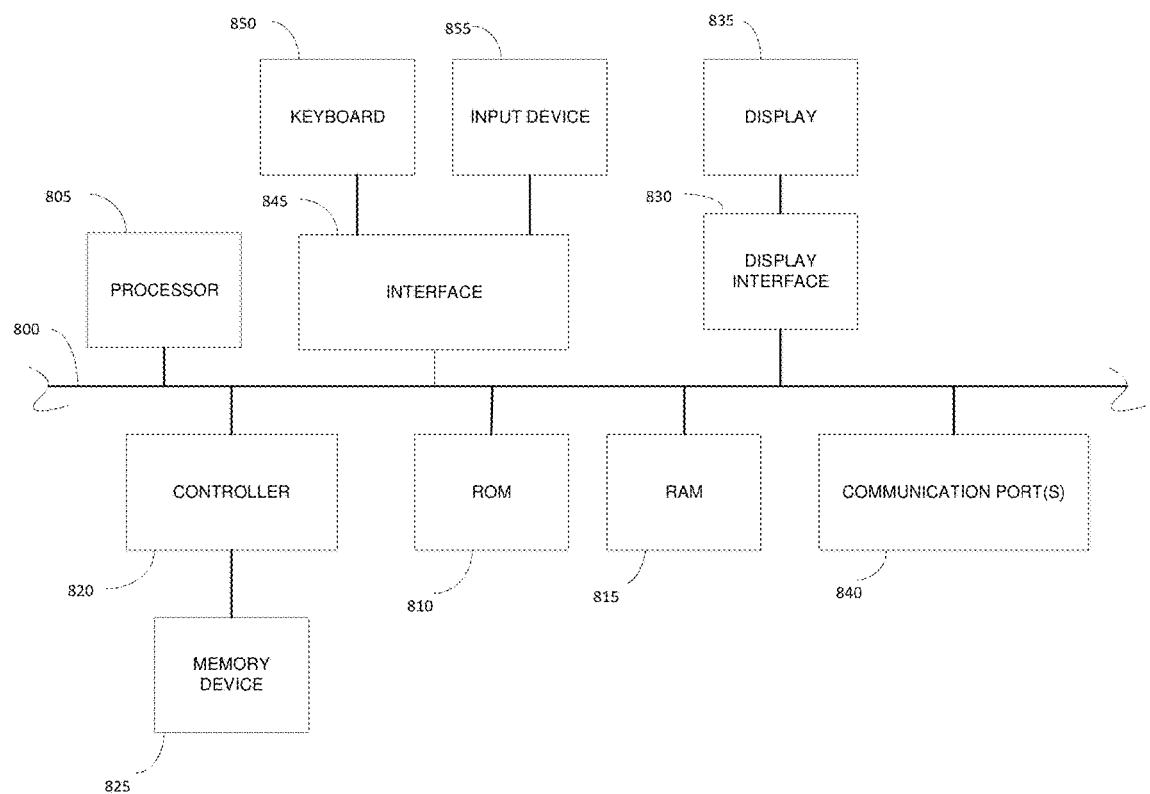
FIG. 8 depicts various embodiments of one or more electronic devices for implementing the various methods and processes described in this document.

FIG. 8 depicts an example of internal hardware that may be used to contain or implement the various computer processes and systems as discussed above, such as the client computing devices, the message generation server and/or the web server described above. Thus, any of the user electronic devices, servers, or computing devices discussed above may include some or all of the hardware architecture illustrated in FIG. 1. An electrical bus 800 serves as an information highway interconnecting the other illustrated components of the hardware. Processor 805 is a central processing unit of the system, performing calculations and logic operations required to execute a program. Processor 805, alone or in conjunction with one or more of the other elements disclosed in FIG. 8, is a processing device, computing device or processor as such terms are used within this disclosure. Processor 805 may be a physical processing device, a virtual device contained within another processing device, or a container included within a processing device.

Read only memory (ROM) 810 and random access memory (RAM) 815 constitute examples of memory devices. A controller 820 interfaces with one or more optional memory devices 825 that service as data storage facilities to the system bus 800. These memory devices 825 may include, for example, an external DVD drive or CD ROM drive, a hard drive, flash memory, a USB drive or another type of device that serves as a data storage facility. As indicated previously, these various drives and controllers are optional devices. Additionally, the memory devices 825 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 810 and/or the RAM 815. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

A display interface 830 may permit information from the bus 800 to be displayed on the display 835 in audio, visual, graphic or alphanumeric format. Communication with external devices may occur using various communication ports 840. A communication port 840 may be attached to a communications network, such as the Internet, a local area network or a cellular telephone data network.

The hardware may also include an interface 845 which allows for receipt of data from input devices such as a keyboard 850 or other input device 855 such as a remote control, a pointing device, a video input device (camera) and/or an audio input device (microphone).

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of determining whether an electronic message was delivered to an intended recipient or intercepted by a sandbox, comprising:
   by a message generation server:
      identifying a recipient for receiving a message,
      selecting a first identifier that may be actuated and a second identifier that may be actuated, wherein the first identifier comprises a hyperlink that is associated with a web page at a web address,
      generating an electronic message so that the message includes the hyperlink, and
      transmitting the electronic message to the recipient via a communication network for delivery to an address of the recipient; and
   by a web server:
      hosting the web page so that the web page includes the second identifier in a format that is not visible to a human user of the web page,
      monitoring whether interaction occurs with the second identifier, and
      determining whether a sandbox may have intercepted the electronic message based on whether the web server detects interaction with the second identifier.

2. The method of claim 1, wherein determining whether a sandbox may have intercepted the electronic message comprises:
   determining that the sandbox intercepted the electronic message before delivery to the recipient if the web server detects interaction with the address of the second hyperlink within a threshold period of time, otherwise determining that the electronic message has not been intercepted.

3. A method of determining whether an electronic message was intercepted by a sandbox, comprising:
   by a message generation server:
      selecting a first identifier that may be actuated and a second identifier that may be actuated, so that the first identifier and the second identifier share at least one common attribute, and so that the first identifier and the second identifier also include at least one attribute that is not common, and
      generating a first electronic message so that the first electronic message includes the first and second identifiers, and
      transmitting the first electronic message for delivery to a first recipient address via a communication network; and
   by a web server:
      detecting interaction with the first identifier,
      monitoring whether interaction occurs with the second identifier within a threshold period of time after detecting interaction with the first identifier, and
      if interaction occurs with the second identifier within the threshold period of time, determining that the first electronic message has been intercepted by a sandbox, otherwise determining that the first electronic message has not been intercepted.

4. The method of claim 3, wherein:
   the first identifier comprises a hyperlink and the second identifier also comprises a hyperlink; and
   monitoring whether interaction occurs with the first and second identifiers comprises, for each identifier, monitoring an address associated with the identifier's hyperlink to determine whether a service request is received at the address.

5. The method of claim 4, wherein the common attribute comprises a domain.

6. The method of claim 3, wherein:
the first identifier comprises a message attachment and the second identifier also comprises a message attachment; and
monitoring whether interaction occurs with the first and second identifiers comprises, for each identifier, determining whether an action that the identifier is configured to perform upon opening the message attachment has occurred.

7. The method of claim 6, wherein the common attribute comprises a file extension.

8. The method of claim 4, wherein:
the first identifier comprises an address of a first image that is stored on an image server;
the second identifier comprises an address of a second image that is also stored on an image server;
the common attribute comprises an address of the image server; and
monitoring whether interaction occurs with the first and second identifier comprises, for each identifier, determining whether the image server has received a request for the identifier's image.

9. A method of generating an electronic message, comprising:
by a message generation server:
selecting a first identifier that may be actuated,
selecting a second identifier associated with a recipient,
generating a plurality of electronic messages so that:
each electronic message embeds the first identifier using one of a plurality of embedding methods, and the plurality of electronic messages collectively use more than one of the plurality of embedding messages; and
each electronic message embeds the second identifier in a way that the message generation server knows is likely to be accessed;
generating a recipient address associated with a recipient that the message generation server knows is invalid or that the message generation server determines is likely to be invalid, and
transmitting the plurality of electronic messages for delivery to the recipient address via a communication network; and
by a web server:
monitoring whether one or more interactions occur with the first and second identifiers in the plurality of electronic messages within a threshold period of time, and
generating a cumulative fingerprint based on the one or more interactions with the first and second identifier in the plurality of electronic messages.

10. The method of claim 9, further comprising, by the message generation server:
generating one or more additional electronic messages, wherein each of the additional electronic messages embeds the first and second identifiers based on the cumulative fingerprint;
generating another recipient address associated with a recipient that the message generation server knows is valid or that the message generation server determines is likely to be valid; and
transmitting the one or more additional electronic messages for delivery to the another recipient address via a communication network.

11. The method of claim 10, wherein the interactions with the first and second identifier are indicative of one or more of the following characteristics: an IP address, an IP address range, a DNS name, a browser type, a browser version and a browser plugin.

12. An electronic messaging system, comprising:
a message generation server comprising a processor and a memory portion containing programming instructions that are configured to cause the message generation server to:
identify a recipient for receiving a message,
select a first identifier that may be actuated and a second identifier that may be actuated, wherein the first identifier comprises a hyperlink that is associated with a web page at a web address,
generate an electronic message so that the message includes the hyperlink, and
transmit the electronic message to the recipient via a communication network for delivery to an address of the recipient; and
a web server comprising a processor and a memory portion containing programming instructions that are configured to cause the web server to:
host the web page so that the web page includes the second identifier in a format that is not visible to a human user of the web page,
monitor whether interaction occurs with the second identifier, and
determine whether a sandbox may have intercepted the electronic message based on whether the web server detects interaction with the second identifier.

13. The system of claim 12, wherein the instructions to determine whether a sandbox may have intercepted the electronic message comprise instructions to:
determine that the sandbox intercepted the electronic message before delivery to the recipient if the web server detects interaction with the address of the second hyperlink within a threshold period of time, otherwise determine that the electronic message has not been intercepted.

14. An electronic messaging system, comprising:
a message generation server comprising a processor and a memory portion containing programming instructions that are configured to cause the message generation server to:
select a first identifier that may be actuated and a second identifier that may be actuated, so that the first identifier and the second identifier share at least one common attribute, and so that the first identifier and the second identifier also include at least one attribute that is not common, and
generate a first electronic message so that the first electronic message includes the first and second identifiers, and
transmit the first electronic message for delivery to a first recipient address via a communication network; and
a web server comprising a processor and a memory portion containing programming instructions that are configured to cause the web server to:
detect interaction with the first identifier,
monitor whether interaction occurs with the second identifier within a threshold period of time after detecting interaction with the first identifier, and if interaction occurs with the second identifier within the threshold period of time, determine that the first electronic message has been intercepted by a sandbox, otherwise determine that the first electronic message has not been intercepted by the sandbox.

15. The system of claim 14, wherein:
the first identifier comprises a hyperlink and the second identifier also comprises a hyperlink; and
the instructions to monitor whether interaction occurs with the first and second identifiers comprise instructions to, for each identifier, monitor an address associated with the identifier's hyperlink to determine whether a service request is received at the address.

16. The system of claim 15, wherein the common attribute comprises a domain.

17. The system of claim 14, wherein:
the first identifier comprises a message attachment and the second identifier also comprises a message attachment; and
the instructions to monitor whether interaction occurs with the first and second identifiers comprise instructions to, for each identifier, determine whether an action that the identifier is configured to perform upon opening the message attachment has occurred.

18. The system of claim 17, wherein the common attribute comprises a file extension.

19. The method of claim 14, wherein:
the first identifier comprises an address of a first image that is stored on an image server;
the second identifier comprises an address of a second image that is also stored on an image server;
the common attribute comprises an address of the image server; and
the instructions to monitor whether interaction occurs with the first and second identifier comprise instructions to, for each identifier, determine whether the image server has received a request for the identifier's image.

20. An electronic messaging system, comprising:
a message generation server comprising a processor and a memory portion containing programming instructions that are configured to cause the message generation server to:
select a first identifier that may be actuated,
select a second identifier associated with a recipient,
generate a plurality of electronic messages so that:
each electronic message embeds the first identifier using one of a plurality of embedding methods, and the plurality of electronic messages collectively use more than one of the plurality of embedding messages, and
each electronic message embeds the second identifier in a way that the message generation server knows is likely to be accessed,
generate a recipient address associated with a recipient that the message generation server knows is invalid or that the message generation server determines is likely to be invalid, and
transmit the plurality of electronic messages for delivery to the recipient address via a communication network; and
a web server comprising a processor and a memory portion containing programming instructions that are configured to cause the web server to:
monitor whether one or more interactions occur with the first and second identifiers in the plurality of electronic messages within a threshold period of time, and
generate a cumulative fingerprint based on the one or more interactions with the first and second identifier in the plurality of electronic messages.

21. The system of claim 20, wherein:
the message generation server comprises additional programming instructions that are configured to cause the message generation server to:
generate one or more additional electronic messages, wherein each of the additional electronic messages embeds the first and second identifiers based on the cumulative fingerprint;
generate another recipient address associated with a recipient that the message generation server knows is valid or that the message generation server determines is likely to be valid; and
transmit the one or more additional electronic messages for delivery to the another recipient address via a communication network.

22. The system of claim 21, wherein the interactions with the first and second identifier are indicative of one or more of the following characteristics: an IP address, an IP address range, a DNS name, a browser type, a browser version and a browser plugin.

* * * * *